US007195477B2

(12) United States Patent
Ikeda et al.

(10) Patent No.: US 7,195,477 B2
(45) Date of Patent: Mar. 27, 2007

(54) SHEET MATERIAL PRESSING MACHINES

(75) Inventors: Hiroyuki Ikeda, Toyota (JP); Masanori Ogawa, Toyota (JP); Tetsushi Watanabe, Toyota (JP); Tsuyoshi Inoue, Toyota (JP); Masaaki Ando, Toyota (JP); Kunio Tabata, Toyota (JP)

(73) Assignees: Kojima Press Industry Co. Ltd, Toyota (JP); Tekunohama Co, Ltd, Toyota (JP); Wako Machine Works Co, Ltd, Toyota (JP)

( * ) Notice: Subject to any disclaimer, the term of this patent is extended or adjusted under 35 U.S.C. 154(b) by 0 days.

(21) Appl. No.: 11/243,383

(22) Filed: Oct. 4, 2005

(65) Prior Publication Data

US 2006/0073230 A1 Apr. 6, 2006

(30) Foreign Application Priority Data

Oct. 5, 2004 (JP) .............................. 2004-292483

(51) Int. Cl.
*B28B 11/10* (2006.01)
(52) U.S. Cl. ...................... 425/395; 425/397; 425/398; 425/403; 425/510; 425/511; 425/519; 425/521
(58) Field of Classification Search ................ 425/383, 425/390, 394, 395, 397, 398, 403, 510, 511, 425/519, 521
See application file for complete search history.

(56) References Cited

U.S. PATENT DOCUMENTS

| 4,267,140 | A | * | 5/1981 | Meeker ...................... 264/291 |
| 4,427,476 | A | | 1/1984 | Beck et al. |
| 5,076,880 | A | * | 12/1991 | Spengler et al. ............ 156/382 |
| 5,215,695 | A | * | 6/1993 | Bortoluzzi et al. ......... 264/102 |
| 5,249,946 | A | * | 10/1993 | Marx ......................... 425/142 |
| 5,324,384 | A | * | 6/1994 | Spengler ..................... 156/581 |
| 6,719,551 | B2 | * | 4/2004 | Polk, Jr. ................... 425/126.1 |
| 2003/0155685 | A1 | | 8/2003 | Spengler et al. |

FOREIGN PATENT DOCUMENTS

| DE | 10022269 | 11/2001 |
| EP | 0503800 | 9/1992 |
| JP | 61-141528 | 6/1986 |
| JP | 3-173615 | 7/1991 |
| JP | 05-208463 | 8/1993 |
| JP | 2004-195684 | 7/2004 |

OTHER PUBLICATIONS

European Search Report for Application No. 0509274.1, dated Feb. 16, 2006.
Japanese Office Action dated Oct. 18, 2006.
English translation of Japanese Office Action dated Oct. 18, 2006.
English Abstract for JP 2004-195684.
English Abstract for JP 61-141528.

* cited by examiner

*Primary Examiner*—Yogendra Gupta
*Assistant Examiner*—Maria Veronica Ewald
(74) *Attorney, Agent, or Firm*—Conley Rose, P.C.

(57) ABSTRACT

A sheet material pressing machine for pressing a sheet material into a formed article may include a first die unit that can be opened and closed and a second die unit that can be opened and closed. The first and second die units are arranged and constructed such that closing operation of the first die unit and opening operation of the second die unit, or vice versa, can alternately occur.

5 Claims, 6 Drawing Sheets

SHEET MATERIAL PRESSING MACHINES

BACKGROUND OF THE INVENTION

1. Field of the Invention

The present invention relates to sheet material pressing machines for forming an article having a desired shape by pressing a sheet material.

2. Description of the Related Art

A known sheet material pressing machine (hereinafter referred to as a "pressing machine") is taught by, for example, Japanese Patent Number 2,556,754 (Japanese Laid-Open Patent Publication Number 3-173615). The pressing machine includes a die unit which is composed of a pair of dies, i.e., an upper die and a lower die. In this known art, when the upper and lower dies are in an open position, a sheet material is disposed therebetween. Thereafter, the upper and lower dies are closed so that the sheet material is pressed in order to form a formed article having a desired shape. Subsequently, the upper and lower dies are reopened so that the formed article is removed from the machine. Thus, a press forming process for forming the formed article is completed.

As will be recognized, in this known art, a process for forming a single formed article includes a die closing step (i.e., a step of moving the upper and lower dies from an open position to a closed position) and a subsequent die opening step (i.e., a step of moving the upper and lower dies from the closed position to the open position). Therefore, in order to form a large number of formed articles, it is necessary to periodically carry out the die closing step and the die opening step depending on the number of formed articles. As a result, operations for manufacturing a large number of formed articles using this known art are time-consuming. This time-consuming work may lead to increase manufacturing costs of the formed articles.

SUMMARY OF THE INVENTION

It is, accordingly, one object of the present invention to provide improved pressing machines for manufacturing formed articles from sheet materials.

In one embodiment of the present invention, a sheet material pressing machine for pressing a sheet material into a formed article may include a first die unit that can be opened and closed and a second die unit that can be opened and closed. The first and second die units are arranged and constructed such that the closing operation of the first die unit and opening operation of the second die unit, or vice versa, can alternately occur.

Thus, according to the present pressing machine, when the first die unit is closed in order to form the formed article, the second die unit can be opened in order to release the previously formed article therefrom. To the contrary, when the second die unit is closed in order to form the formed article, the first die unit can be opened in order to release the previously formed article therefrom. That is, formation of the formed article by the first die unit and releasing of the formed article previously formed in the second die unit, or vice versa, can be substantially simultaneously performed. Therefore, a plurality of formed articles can be efficiently manufactured. That is, it is possible to manufacture a large number of formed articles in a shorter time. As a result, manufacturing costs of the formed articles can be reduced.

In one embodiment of the present invention, the first and second die units each have first and second dies. The first dies of the first and second die units are spaced apart from each other. The second dies of the first and second die units are movably disposed between the first dies of the first and second die units so as to move toward and away from the corresponding first dies.

Optionally, the pressing mechanism further may have a first and second fixed members that are laterally spaced apart from each other, and an intermediate movable member that is laterally reciprocably disposed between the first and second fixed members. The first and second dies of the first die unit are respectively attached to the opposite surfaces of the first fixed member and the movable member. The first and second dies of the second die unit are respectively attached to the opposite surfaces of the second fixed member and the movable member. Closing operation of the first die unit and opening operation of the second die unit, or vice versa, can be simultaneously performed depending upon the lateral reciprocating motion of the movable member.

Other objects, features and advantage of the present inventions will be readily understood after reading the following detailed description together with the accompanying drawings and the claims.

DETAILED DESCRIPTION OF THE INVENTION

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detailed description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

A detailed representative embodiment of the present invention is shown in FIG. 1 to FIG. 6.

Figure 1:
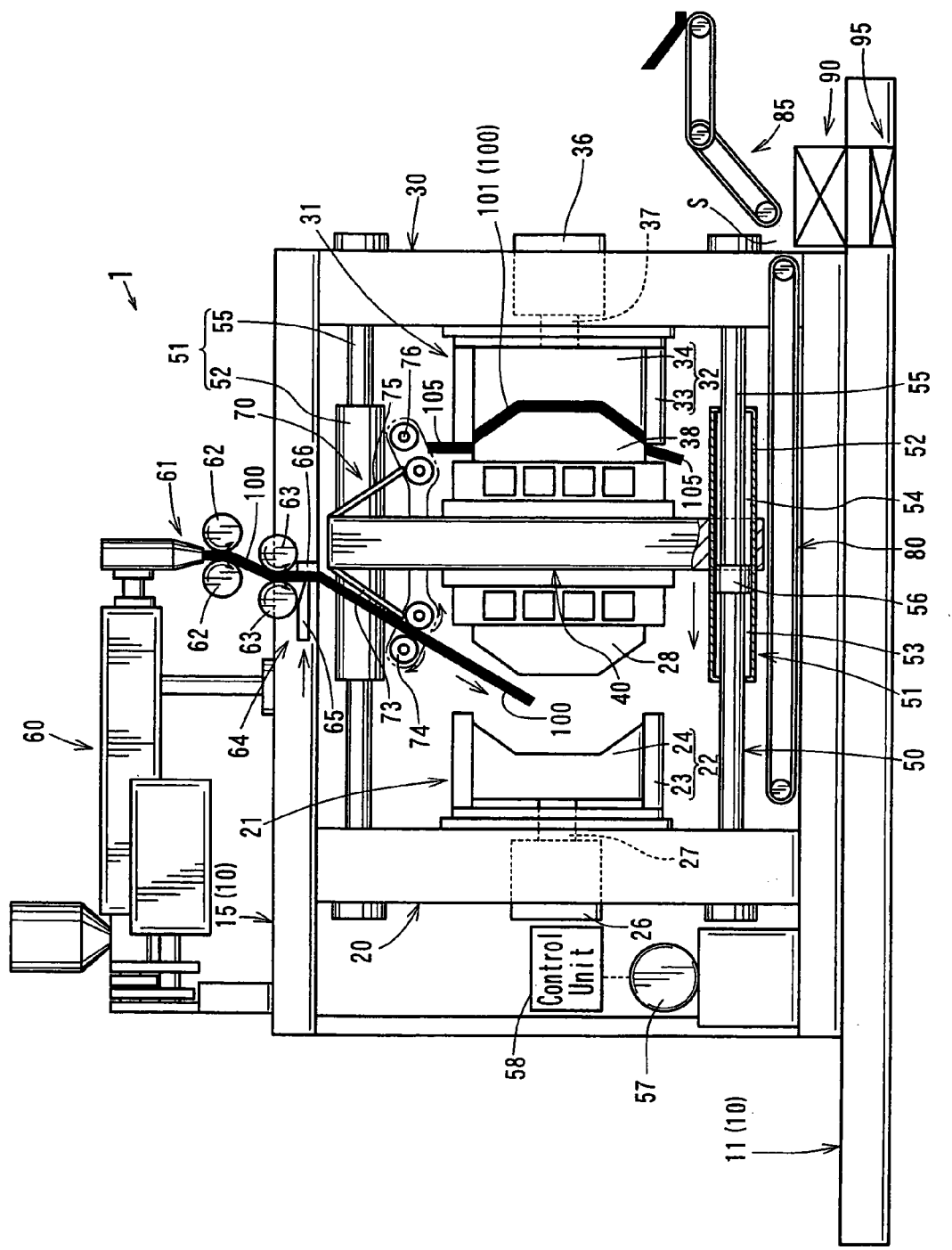
FIG. 1 is an explanatory view of a sheet material pressing machine according to a representative embodiment of the present invention, illustrating a condition in which first and second dies of a first die unit are in an open position and first and second dies of a second die unit are in a trimming position.

As shown in FIG. 1, a pressing machine 1 is intended to press a sheet material 100, thereby forming a formed article 101. Further, the sheet material 100 may preferably be a thermoplastic resin based sheet material. Also, the example of the formed article 101 may preferably be a fender liner, an engine under cover, an under deflector of a vehicle or other such members. The pressing machine 1 may includes a main frame 10 that is constructed from an upper lateral frame portion 15 and a lower lateral frame 11. The pressing machine 1 may also include a pair of fixed vertical plates, i.e., first and second fixed plates 20 and 30 (i.e., first and second fixed members) and an intermediate vertical movable (reciprocating) plate 40 (i.e., a movable member). The first and second fixed plates 20 and 30 are disposed between the upper and lower frames 15 and 11 and are fixedly connected thereto. Further, the first and second plates 20 and 30 are laterally spaced apart from each other at a desired interval. The intermediate vertical movable plate 40 is movably disposed between the first and second fixed plates 20 and 30. Preferably, the movable plate 40 is arranged and constructed so as to laterally move (reciprocate) toward and away from each of the first and second fixed plates 20 and 30.

The pressing machine 1 may include a drive mechanism 50 that is horizontally positioned between the upper and lower frames 15 and 11. The drive mechanism 50 is composed of a plurality of (e.g., four) hydraulic devices 51 (two of which are shown in the drawings) that are positioned in the corner portions of the movable plate 40. Each of the hydraulic devices 51 includes a rod 55 having a piston 56 and a hydraulic cylinder 52 integrated with the movable plate 40. The rod 55 has laterally extended opposed ends which are respectively connected to the first and second plates 20 and 30. The piston 56 is positioned on a substantially central portion of the rod 55 and is immovably connected to the rod 55. Conversely, the cylinder 52 is slidably journaled on the rod 55 in a manner that the piston 56 is received in the cylinder 52. Further, the piston 56 is shaped to closely and movably contact the inner surface of the cylinder 52, thereby permitting relative sliding motion between the piston 56 and the cylinder 52. As will be apparent from the drawings, the piston 56 may preferably divide the inner space of the cylinder 52 so as to define a pair of sealed annular hydraulic chambers 53 and 54 within the cylinder 52. The hydraulic chambers 53 and 54 thus formed are fluidly communicated with a hydraulic pump 57 (i.e., a hydraulic source) via feeder pipes (not shown). Therefore, when hydraulic fluid is fed into the hydraulic chambers 53 and 54 from the hydraulic pump 57, the cylinder 52 is moved along the rod 55 so that the movable plate 40 connected to the cylinder 52 can be laterally (right and left in the drawings) moved or reciprocated between the first and second plates 20 and 30.

Generally, the hydraulic pump 57 is communicated with a control unit 58 so as to be appropriately controlled based upon a predetermined control program. Therefore, the cylinder 52 and thus the movable plate 40 can be controllably reciprocated in a predetermined moving speed mode.

Further, the pressing machine 1 may include a first die unit 21 that is disposed between opposite surfaces of the first fixed plate 20 and the movable plate 40, and a second die unit 31 that is disposed between opposite surfaces of the second fixed plate 30 and the movable plate 40. Typically, the first and second die unit 21 and 31 have substantially the same construction as each other.

The first die unit 21 is essentially composed of a pair of dies, i.e., a first or female die 22 and a second or male die 28. The first and second dies 22 and 28 are respectively attached to the first plate 20 and the movable plate 40.

The first die 22 is composed of a forming die part or inner die part 24 and a frame-shape trimming die part or outer die part 23. The inner die part 24 is laterally movably received in the outer die part 23. Also, the inner die part 24 is coupled to a rod 27 of a hydraulic device 26 that is fixedly attached to the first plate 20. The hydraulic device 26 is arranged and constructed such that the inner die part 24 is normally biased or forced hydraulically toward the second die 28. The outer die part 23 is arranged and constructed to engage the outer periphery of the second die 28 so as to function as a trimming member for the formed article 101 when the first and second dies 22 and 28 are moved to a trimming position beyond a forming position. Further, the trimming position and the forming position of the first and second dies 22 and 28 respectively correspond to a relative position shown in FIG. 4 and a relative position shown in FIG. 3. As will be appreciated, in the forming position of the first and second dies 22 and 28 of the first die unit 21, the sheet material 100 is pressed so as to form the formed article 101. Also, in the trimming position of the first and second dies 22 and 28 of the first die unit 21, the formed article 101 is circumferentially trimmed so as to remove a waste strip 105 therefrom.

Similarly, the second die unit 31 is essentially composed of a pair of dies, i.e., a first or female die 32 and a second or male die 38. The first and second dies 32 and 38 are respectively attached to opposite surfaces of the second plate 30 and the movable plate 40.

The first die 32 is composed of a forming die part or inner die part 34 and a frame-shape supplemental die part or outer die part 33. The inner die part 34 is laterally movably received in the outer die part 33. Also, the inner die part 34 is coupled to a rod 37 of a hydraulic device 36 that is fixedly attached to the second plate 30. The hydraulic device 36 is arranged and constructed such that the inner die part 34 is normally biased or forced hydraulically toward the second die 38. The outer die part 33 is arranged and constructed to engage the outer periphery of the second die 38 so as to function as a trimming member for trimming the formed article 101 when the first and second dies 32 and 38 are moved to a trimming position beyond a forming position. Further, the trimming position of the first and second dies 32 and 38 corresponds to a relative position shown in FIG. 1. (The forming position of the first and second dies 32 and 38 is not shown in the drawings.) As will be appreciated, in the forming position of the first and second dies 32 and 38 of the second die unit 31, the sheet material 100 is pressed so as to form the formed article 101. Also, in the trimming position of the first and second dies 32 and 38 of the second die unit 31, the formed article 101 is circumferentially trimmed so as to remove the waste strip 105 therefrom.

Figure 4:
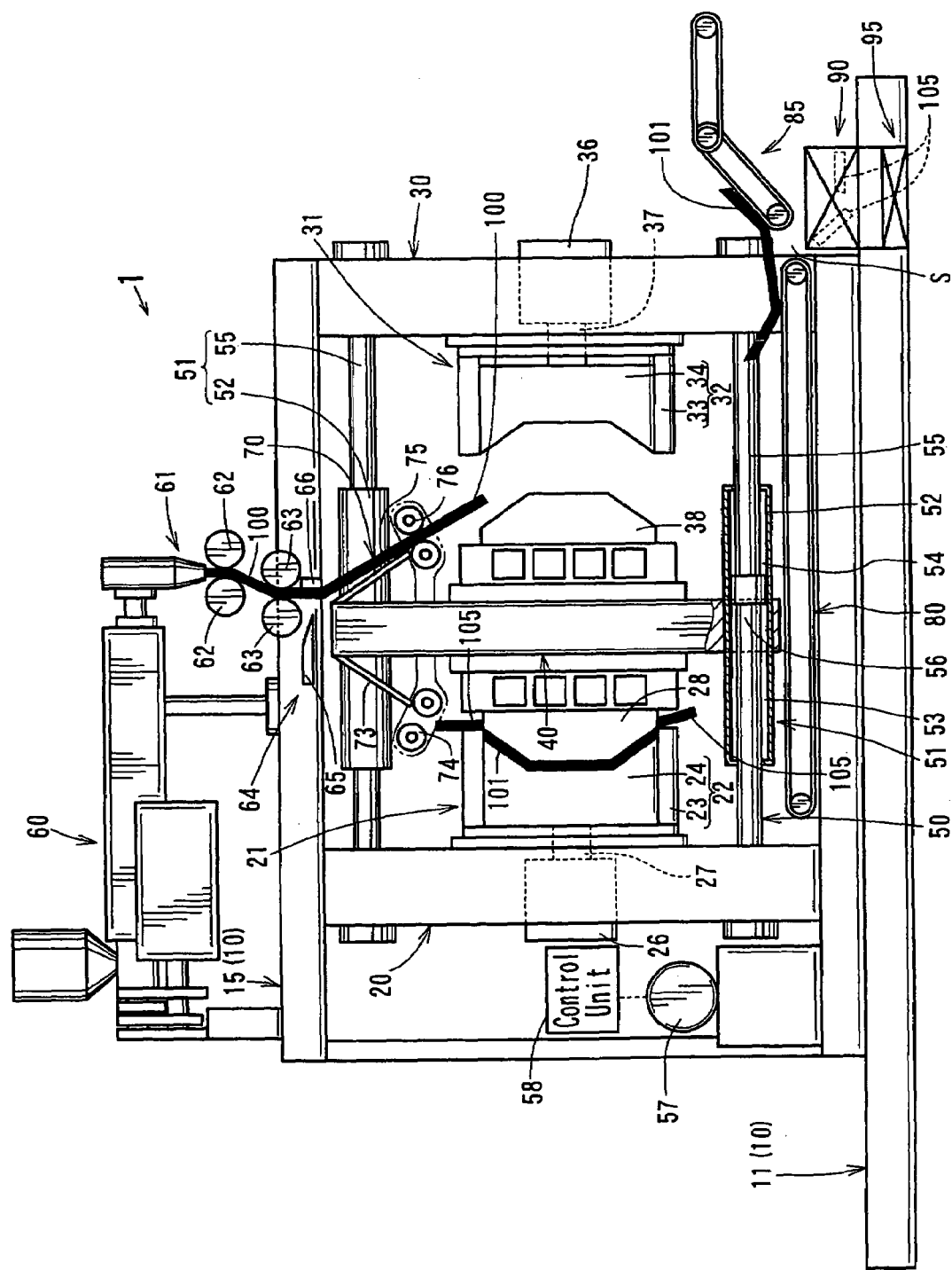
FIG. 4 is an explanatory view of the sheet material pressing machine, illustrating a condition in which the first and second dies of the first die unit are in a trimming position and the first and second dies of the second die unit are in an open position.

The first and second die units 21 and 31 are arranged and constructed as described above. Therefore, as shown in FIG. 1, when the hydraulic pump 57 is actuated so that the movable plate 40 connected to the cylinder 52 is moved to a rightmost position (i.e., one limit position), the first die unit 21 is moved to an open condition (i.e., the first and second dies 22 and 28 are moved to an open position). At this time, the second die unit 31 is moved to a closed condition (i.e., the first and second dies 32 and 38 are moved to the trimming position). To the contrary, as shown in FIG. 4, when the hydraulic pump 57 is actuated so that the movable plate 40 connected to the cylinder 52 is moved to a leftmost position (i.e., the other limit position), the first die unit 21 is moved to a closed condition (i.e., the first and second dies 22 and 28 are moved to the trimming position). At this time, the second die unit 31 is moved to an open condition (i.e., the first and second dies 32 and 38 are moved to an open position).

The pressing machine 1 may further include an extrusion molding device 60 for continuously extruding the sheet material 100, and a desired number of pairs (e.g., two pairs) of rollers 62 and 63. The extrusion molding device 60 is disposed on the upper frame 15 of the main frame 10. The extrusion molding device 60 includes an extrusion die 61. The extrusion die 61 is arranged and constructed such that the sheet material 100 can be downwardly extruded. The pairs of rollers 62 and 63 are sequentially arranged so as to pull out and convey the extruded sheet material 100 toward the first and second die units 21 and 31 while controlling the thickness thereof. The respective pairs of rollers 62 and 63 may preferably be connected to a roller drive mechanism (not shown) so as to be controllably rotated in a desired direction (i.e., a direction of pulling out the sheet material 100). Typically, the drive mechanism is a motor-powered drive mechanism. Further, the pair of rollers 62 may preferably be spaced apart from each other at a desired interval and be normally biased or forced in a direction toward each other by means of a biasing means (not shown) such as a hydraulic device and a spring. Similarly, the pair of rollers 63 may preferably be spaced apart from each other at a desired interval and be normally biased or forced in a direction toward each other. Further, the rollers 62 and 63 may preferably be preheated so as to keep the temperature of the sheet material 100.

The pressing machine 1 may further include a cutter device 64 for cutting the sheet material 100 conveyed via the rollers 62 and 63 in a desired length. The cutter device 64 may preferably be composed of a cutter blade 65 and an anvil plate 66. Typically, the cutter blade 65 is connected to a drive mechanism (not shown) so as to be horizontally moved toward and away from the anvil plate 66. The drive mechanism may preferably be programmed such that the cutter blade 65 is moved toward the anvil plate 66 when a predetermined length of sheet material 100 is pulled out, thereby cutting the sheet material 100 in a required length corresponding to the formed article 101.

Also, the pressing machine 1 may include a deflection device 70 for alternately deflecting the sheet material 100 toward the first die unit 21 or the second die unit 31. The deflection device 70 may preferably be composed of first and second guide plates 73 and 75 and first and second pairs of guide rollers (pulling rollers) 74 and 76. The first and second guide plates 73 and 75 may preferably be attached to the upper portion of the movable plate 40. Further, the first and second guide plates 73 and 75 may respectively be downwardly inclined so as to be directed toward the first die 22 of the first die unit 21 and the first die 32 of the second die unit 31. The first pair of guide rollers 74 may preferably be attached to the movable plate 40 so as to be positioned adjacent to the lower end of the first guide plate 73. The first pair of guide rollers 74 thus positioned may preferably be connected to a roller drive mechanism (not shown) so as to controllably pull out the sheet material 100. Similarly, the second pair of guide roller 76 may preferably be attached to the movable plate 40 so as to be positioned adjacent to the lower end of the second guide plate 75. The second pair of guide rollers 76 thus positioned may preferably be connected to a roller drive mechanism (not shown) so as to controllably pull out the sheet material 100.

The pressing machine 1 may further include a carrier conveyer 80 (e.g., a belt conveyer or a roller conveyer) and an article take out conveyer 85. The carrier conveyer 80 is disposed under the first and second die units 21 and 31 so as to convey the formed article 101 and the waste strip 105 in a desired direction (which corresponds to the rightward direction in the drawings). The article take out conveyer 85 is disposed outside of the main frame 10 of the pressing machine 1 so as to convey only the formed article 101 toward a desired place for storage or post treatment. As will be apparent from the drawings, the take out conveyer 85 may preferably be positioned spaced apart from the carrier conveyer 80 at a desired spacing S so that the waste strip 105 can fall therethrough.

The pressing machine 1 may additionally include a waste crushing device 90 and a waste take out conveyer 95. The waste crushing device 90 may preferably be disposed under the spacing S formed between the conveyers 80 and 85 so as to receive and crush the waste strip 105 fallen through the spacing S. The waste take out conveyer 95 is disposed under the waste crushing device 90 so as to carry out the crushed waste strip 105.

Representative methods for manufacturing the formed article 101 using this pressing machine 1 will now be described.

First, the process for producing the formed article 101 by the first die unit 21 will be described.

As shown in FIG. 1, the hydraulic pump 57 is actuated in response to special commands from the control unit 58 so that the hydraulic fluid is fed into the hydraulic chamber 54 of the cylinder 52. As a result, the cylinder 52 and thus the movable plate 40 connected thereto are moved to the rightmost position. Thus, the first die unit 21 is moved to the open condition. At this time, the second die unit 31 is in the closed condition.

Thereafter, the extrusion molding device 60 is actuated so as to extrude a molding material from the extrusion die 61, thereby forming the sheet material 100. The sheet material 100 thus formed is advanced via the rollers 62 and 63 while keeping a uniform thickness. When the sheet material 100 is pulled out at the desired length, the cutter blade 65 of the cutter device 64 is actuated by the drive mechanism so that the sheet material 100 is cut in the required length.

The cut sheet material 100 is then guided downwardly by means of the first guide plate 73 of the deflection device 70. Thereafter, the sheet material 100 is further advanced by means of the first pair of guide rollers 74 of the deflection device 70 toward the first die unit 21.

Subsequently, the hydraulic pump 57 is reversely actuated in response to different commands from the control unit 58 so that the hydraulic fluid is fed into the hydraulic chamber 53 of the cylinder 52. As a result, the cylinder 52 and thus the movable plate 40 connected thereto are moved leftwardly. Thus, the second die 28 begins to move toward the first die 22 (i.e., the first die unit 21 begins to move from the open condition toward the closed condition).

Figure 2:
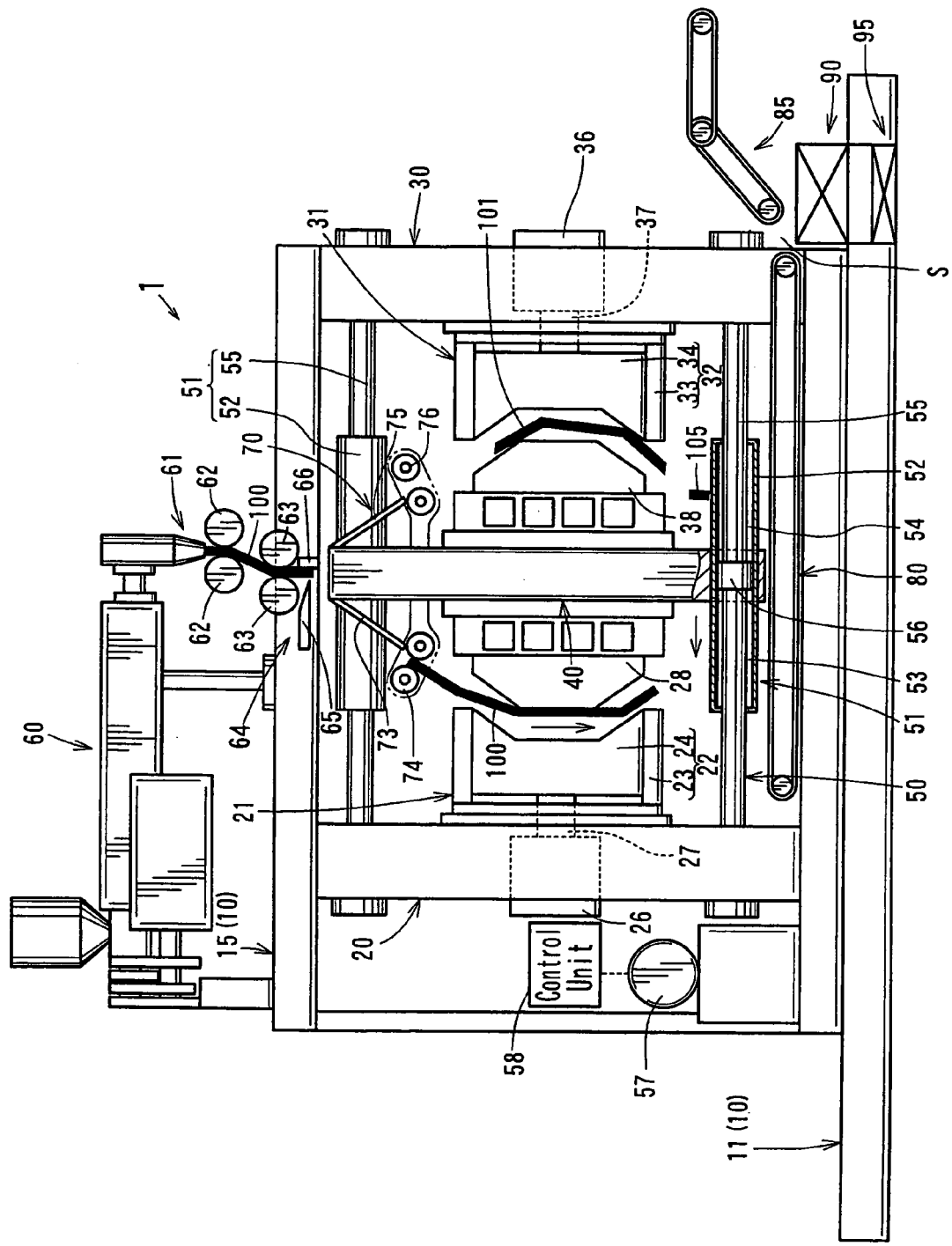
FIG. 2 is an explanatory view of the sheet material pressing machine, illustrating a condition in which the first and second dies of the first die unit are being moved toward a forming position and the first and second dies of the second die unit are being moved toward an open position.

As shown in FIG. 2, during this motion of the first die unit 21, the sheet material 100 advanced into the first die unit 21 is appropriately positioned between the first and second dies 22 and 28 of the first die unit 21.

Figure 3:
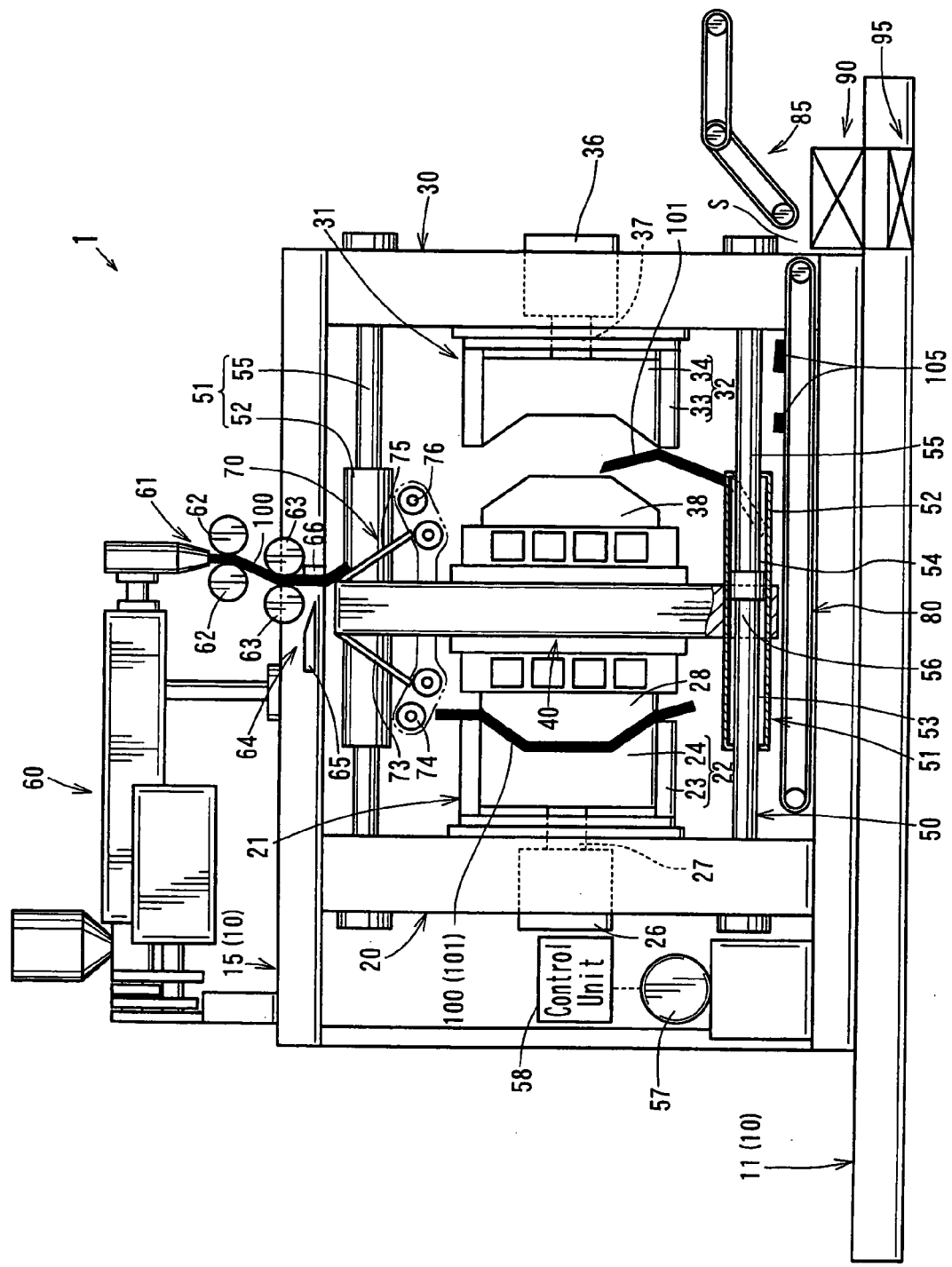
FIG. 3 is an explanatory view of the sheet material pressing machine, illustrating a condition in which the first and second dies of the first die unit are in the forming position and the first and second dies of the second die unit are substantially opened.

As shown in FIG. 3, when the movable plate 40 connected to the cylinder 52 is further moved leftwardly so that the first and second dies 22 and 28 of the first die unit 21 reach the forming position, the sheet material 100 is compressed between the first die 22 (the inner die part 24) and the second die 28 so that the formed article 101 can be formed having a desired shape. Typically, the hydraulic pump 57 may be appropriately designed such that the first die unit 21 can be applied with a desired compressive load (e.g., twenty tons) by the hydraulic fluid.

Further, the hydraulic pump 57 may preferably be controlled such that the first and second dies 22 and 28 of the first die unit 21 can be held in the forming position for a desired time (e.g., for several seconds) in order to cool down the formed article 101.

After completion of forming and cooling down of the formed article 101, as shown in FIG. 4, the hydraulic pump 57 is further actuated so that the movable plate 40 connected to the cylinder 52 is moved to the leftmost position. At this time, the first and second dies 22 and 28 of the first die unit 21 are shifted from the forming position to the trimming position. That is, the second die 28 is forced into the outer die part 23 of the first die 22 together with the inner die part 24 of the first die 22 against a hydraulic force of the hydraulic device 26 so that the outer die part 23 of the first die 22 engages the outer periphery of the second die 28. As a result, the formed article 101 is circumferentially trimmed so that a waste strip 105 is removed from the formed article 101. Thus, the formation by the first die unit 21 is completed.

Next, the process for producing the formed article 101 by the second die unit 31 will be described.

As shown in FIG. 4, when the movable plate 40 connected to the cylinder 52 is moved to the leftmost position (i.e., when the first and second dies 22 and 28 of the first die unit 21 are moved to the trimming position), the second die unit 31 is in the open condition. Under this condition, the extrusion molding device 60 is actuated again so as to extrude the molding material from the extrusion die 61, thereby forming the sheet material 100. The sheet material 100 thus formed is advanced via the rollers 62 and 63 while keeping a uniform thickness. When the sheet material 100 is pulled out at the desired length, the cutter blade 65 of the cutter device 64 is actuated by the drive mechanism so that the sheet material 100 is cut in the required length.

The cut sheet material 100 is then guided downwardly by means of the second guide plate 75 of the deflection device 70. Thereafter, the sheet material 100 is further advanced by means of the second pair of guide rollers 76 of the deflection device 70 toward the second die unit 31.

Figure 5:
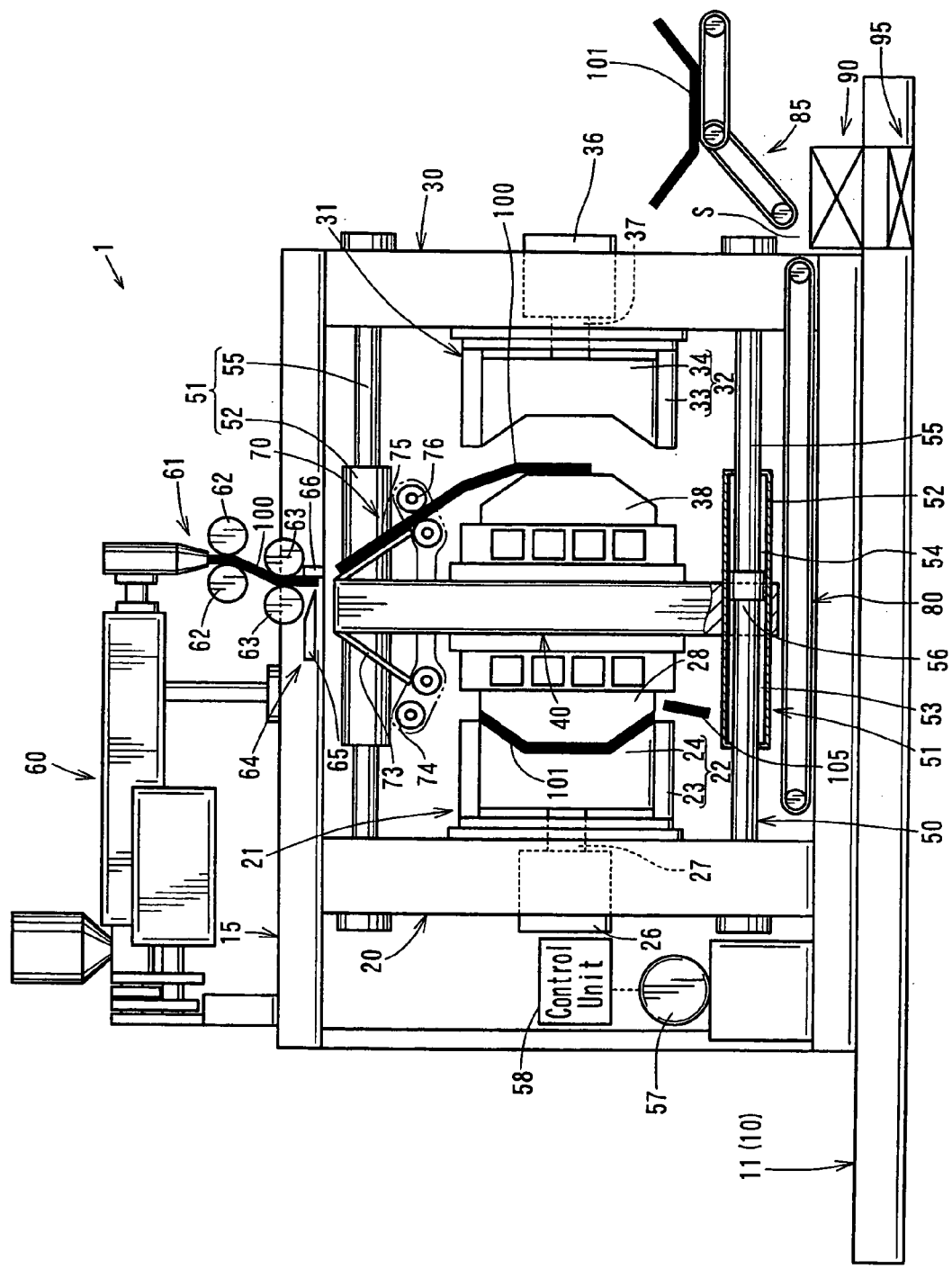
FIG. 5 is an explanatory view of the sheet material pressing machine, illustrating a condition in which the first and second dies of the first die unit are returned to the forming position and the first and second dies of the second die unit are slightly moved toward the forming position.

Subsequently, the hydraulic pump 57 is actuated again in response to the commands from the control unit 58 so that the hydraulic fluid is fed into the hydraulic chamber 54 of the cylinder 52. As a result, the cylinder 52 and the movable plate 40 connected thereto are moved rightwardly. As a result, as shown in FIG. 5, the second die 38 begins to move toward the first die 32 (i.e., the second die unit 31 begins to move from the open condition toward the closed condition).

Figure 6:
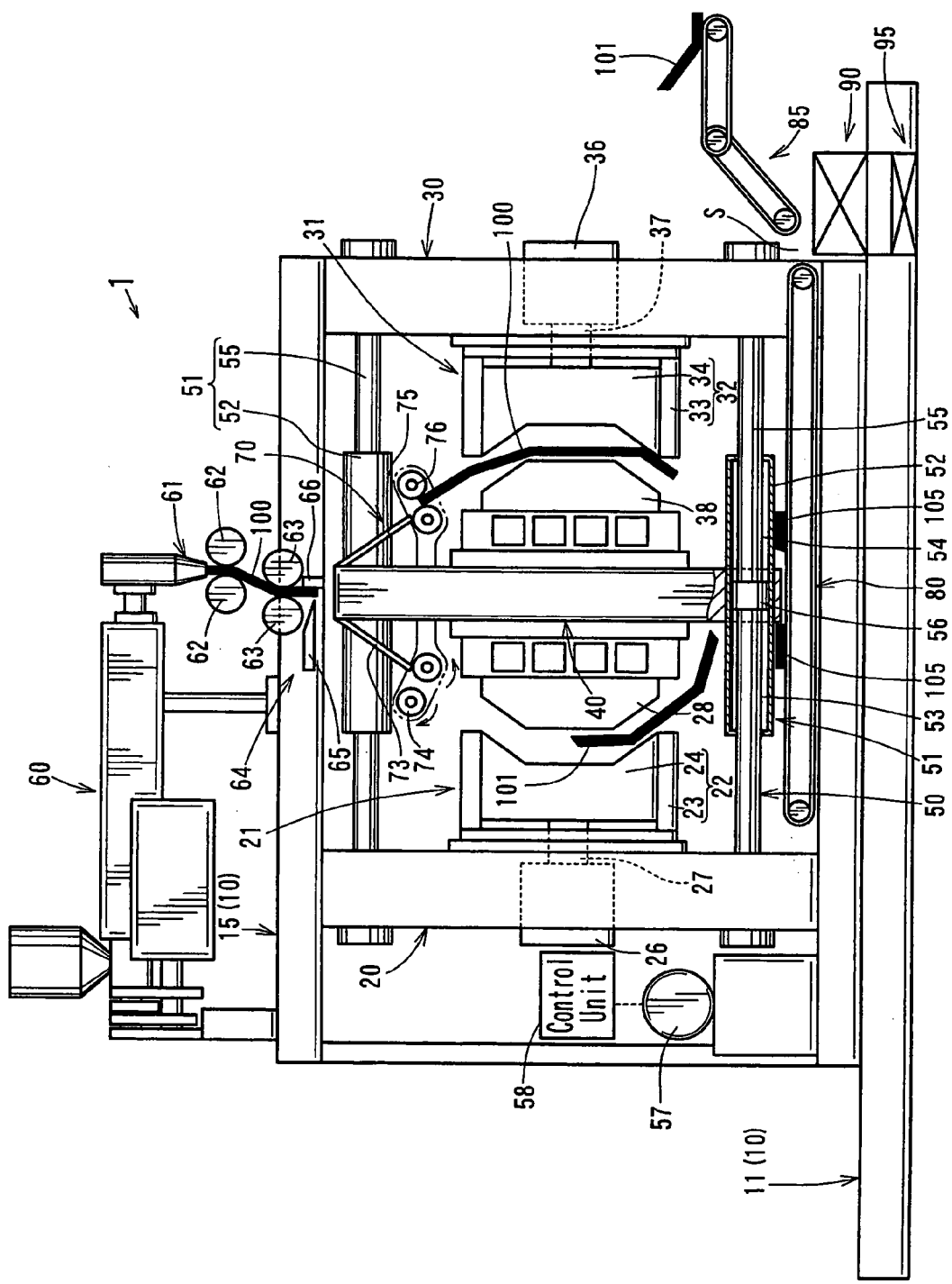
FIG. 6 is an explanatory view of the sheet material pressing machine, illustrating a condition in which the first and second dies of the first die unit are being moved toward the open position and the first and second dies of the second die unit are being moved toward the forming position.

As shown in FIG. 6, during this motion of the first die unit 21, the sheet material 100 advanced into the second die unit 31 is appropriately positioned between the first and second dies 32 and 38 of the second die unit 31.

Although not shown in the drawings, when the movable plate 40 is further moved rightwardly so that the first and second dies 32 and 38 of the second die unit 31 reach the forming position, the sheet material 100 is compressed between the first die 32 (the inner die part 34) and the second die 38 so that the formed article 101 having a desired shape can be formed. Typically, the hydraulic pump 57 may be appropriately designed such that the second die unit 31 can be applied with a substantial compressive load (e.g., twenty tons) by the hydraulic fluid.

Further, the hydraulic pump 57 may preferably be controlled such that the first and second dies 32 and 38 of the second die unit 31 can be held in the forming position for a desired time (e.g., for several seconds) in order to cool down the formed article 101.

After completion of forming and cooling down of the formed article 101, the hydraulic pump 57 is further actuated so that the movable plate 40 connected to the cylinder 52 is moved to the rightmost position (FIG. 1). At this time, the first and second dies 32 and 38 of the second die unit 31 are shifted from the forming position to the trimming position. That is, the second die 38 is forced into the outer die part 33 of the first die 32 together with the inner die part 34 of the first die 32 against a hydraulic force of the hydraulic device 36 so that the outer die part 33 of the first die 32 engages the outer periphery of the second die 38. As a result, the formed article 101 is circumferentially trimmed so that a waste strip 105 is removed from the formed article 101. Thus, the formation by the second die unit 31 is completed.

Upon completion of the formation by the second die unit 31, the formation by the first die unit 21 is repeated in the same manner as described above.

As will be easily understood, the formed article 101 and the waste strip 105 produced by the first die 21 can be automatically released and recovered during the formation process by the second die 31. To the contrary, the formed article 101 and the waste strip 105 produced by the second die 31 can be automatically released and recovered during the formation process by the first die 21.

For example, as shown in FIG. 6, when the second die unit 31 is moved toward the closing condition (i.e., when the second die 38 of the second die unit 31 is moved toward the first die 32 of the second die unit 31), the first die unit 21 is moved toward the open condition. As a result, the formed article 101 and the waste strip 105 are removed or released from the first die unit 21 and fall onto the carrier conveyer 80 as a result of gravity because the first and second dies 22 and 28 of the first die unit 21 are laterally oppositely disposed. Thus, the formed article 101 and the waste strip 105 are conveyed toward the article take out conveyer 85 by the carrier conveyer 80.

The formed article 101 conveyed to the article take out conveyer 85 by the carrier conveyer 80 is transferred onto the article take out conveyer 85 and is then conveyed to the desired place for storage or post treatment by the conveyer 85. Conversely, the waste strip 105 conveyed to the article take out conveyer 85 is not transferred thereonto and falls into the waste crushing device 90 through the spacing S formed between the carrier conveyer 80 and the article take out conveyer 85. The fallen waste strip 105 is crushed in the waste crushing device 90 and is then carried out via the waste take out conveyer 95. The crushed waste strip 105 may preferably be recycled as the molding material for the sheet material 100.

In the methods described above, the hydraulic pump 57 may preferably be controlled such that the second dies 28 and 38 of the first and second die units 21 and 31 can be relatively rapidly moved between the open and forming positions. To the contrary, the hydraulic pump 57 may preferably be controlled such that the second dies 28 and 38 of the first and second die units 21 and 31 can be relatively slowly moved between the forming and trimming positions.

According to the present methods, when the movable plate 40 is moved to the leftmost position so that the first die unit 21 is changed or switched from the open condition to the closed condition, the second die unit 31 can be simultaneously changed from the closed condition to the open condition. To the contrary, when the movable plate 40 is moved to the rightmost position so that the first die unit 21 is changed or switched from the closed condition to the open condition, the second die unit 31 is simultaneously changed from the open condition to the closed condition. That is, the closing operation of the first die unit 21 and the opening operation of the second die unit 31, or vice versa, can be simultaneously performed. Also, the closing and opening operations of the first and second die units 21 and 31 can be sequentially performed during one stroke of the movable plate 40. Therefore, the formed article 101 can be effectively manufactured.

In addition, the sheet material 100 can be automatically deflected toward the first die unit 21 or the second die unit 31 with the aid of the deflecting device 70 attached to the movable plate 40. That is, the sheet material 100 can be alternately fed to the first and second die units 21 and 31 depending upon the lateral motion of the movable plate 40. Therefore, the sheet material 100 can be smoothly and reliably fed into the first and second die units 21 and 31 in proper timings.

Further, the formed article 101 can be trimmed immediately after the formation thereof within the first and second die units 21 and 31. Therefore, an additional trimming device is not required in order to trim the formed article 101, thereby reducing the manufacturing costs of the formed article 101.

Further, the formed article 101 and the waste strip 105 can be automatically released from the first and second die units 21 and 31 as a result of gravity. Therefore, it is not necessary to additionally provide a releasing device in order to release the formed article 101 and the waste strip 105 from the first and second die units 21 and 31. This may reduce the manufacturing costs of the formed article 101.

The released formed article 101 and the waste strip 105 can be automatically separated from each other and be separately recovered. Therefore, it is not necessary to manually separate the formed article 101 from the waste strip 105. Consequently, labor-intensive and time consuming work is not required to form the formed article.

Further, the hydraulic pump 57 is controlled such that each of the second dies 28 and 38 of the first and second die units 21 and 31 can be relatively rapidly moved between the open and forming positions. Therefore, productivity of the formed article 101 can be increased.

The present invention is not limited to the above described embodiment. For example, the first dies 22 and 32 (or the second dies 28 and 38) of the first and second die units 21 and 31 can be provided with projectable punching pins (not shown) so that the formed article 101 can be formed with desired apertures when the formed article 101 is trimmed.

Also, the first and second die units 21 and 31 can be provided with ejector pins (not shown) so that the formed article 101 can be reliably released therefrom.

Although the plurality of hydraulic devices 51 are used as the drive mechanism 50 in the representative embodiment, a single hydraulic device (not shown) or servo motors (not shown) can be used as the drive mechanism 50, if necessary.

Also, although the cutter device 64 in this embodiment is composed of the cutter blade 65 and the anvil plate 66, the cutter device 64 can be modified, if necessary. For example, a rotary cutter blade (not shown) can be used in place of the cutter blade 65. In addition, the cutter device 64 can be composed of a pair of cutter blades (not shown) that can be engaged with each other. In such a case, at least one of the cutter blades may preferably be arranged and constructed such that the cutter blades can be moved toward and away from each other.

Moreover, in this embodiment, the second dies 28 and 38 of the first and second die units 21 and 31 are attached to the movable plate 40 that can be moved by the drive mechanism 50. However, the second dies 28 and 38 can be directly coupled to the drive mechanism 50 so as to be directly moved by the drive mechanism 50.

What is claimed is:

1. A sheet material pressing machine for pressing a sheet material into a formed article, comprising:
   a first die unit that can be opened and closed, the first die unit having first and second dies;
   a second die unit that can be opened and closed, the second die unit having first and second dies;
   first and second fixed members that are laterally spaced apart from each other;
   an intermediate movable member that is laterally reciprocably disposed between the first and second fixed members;
   an extrusion molding device for extrusion molding the sheet material, the extrusion molding device being disposed over the movable member; and
   a deflecting device for alternately directing the extruded sheet material toward the first and second die units, the deflecting device being attached to the movable member,
   wherein the first and second dies of the first die unit are respectively attached to the opposite surfaces of the first fixed member and the movable member, wherein the first and second dies of the second die unit are respectively attached to the opposite surfaces of the second fixed member and the movable member, and wherein the closing operation of the first die unit occurs with the corresponding opening operation of the second die unit depending upon the lateral reciprocating motion of the movable member, and vice versa.

2. The sheet material pressing machine as in claim 1, wherein each of the first dies of the first and second die units comprises an inner die part and an outer die part that can be movable relative to each other; and wherein the outer die part is arranged and constructed to engage the corresponding second die when the corresponding die unit is closed so that the formed article can be circumferentially trimmed, thereby removing a waste strip therefrom.

3. The sheet material pressing machine as in claim 2, wherein each of the first and second die units is arranged and constructed such that the formed article and the waste strip can be released from the corresponding die unit as a result of gravity when the die unit is opened.

4. The sheet material pressing machine as in claim 3 further comprising:
   a carrier conveyor disposed under the first and second die units in order to convey the formed article and the waste strip; and
   a take out conveyor disposed adjacent to the carrier conveyor in order to convey the formed article,
   wherein the take out conveyor is spaced apart from the carrier conveyor at a desired spacing such that the waste strip can fall therethrough.

5. The sheet material pressing machine as in claim 4 further comprising:
   a waste crushing device disposed under the spacing formed between the carrier conveyor and the take out conveyor in order to receive and crush the fallen waste strip.

* * * * *